United States Patent
Chen et al.

(10) Patent No.: US 8,465,577 B2
(45) Date of Patent: Jun. 18, 2013

(54) BLUE, RED, AND YELLOW DYE COMPOUNDS, AND BLACK INK COMPOSITION COMPRISING THE SAME

(75) Inventors: Hsiao-San Chen, Taoyuan (TW); Jen-Fang Lin, Taoyuan (TW)

(73) Assignee: Everlight USA, Inc., Pineville, NC (US)

( * ) Notice: Subject to any disclaimer, the term of this patent is extended or adjusted under 35 U.S.C. 154(b) by 400 days.

(21) Appl. No.: 12/826,838

(22) Filed: Jun. 30, 2010

(65) Prior Publication Data

US 2011/0308425 A1    Dec. 22, 2011

(30) Foreign Application Priority Data

Jun. 18, 2010 (TW) ................................ 99119826 A

(51) Int. Cl.
C09D 11/02 (2006.01)
C09B 31/08 (2006.01)

(52) U.S. Cl.
USPC .................. 106/31.52; 106/31.58; 106/31.59; 534/827

(58) Field of Classification Search
USPC ................ 106/31.52, 31.58, 31.59; 534/827, 534/829, 831
See application file for complete search history.

(56) References Cited

U.S. PATENT DOCUMENTS

| | | | | |
|---|---|---|---|---|
| 3,485,814 A | * | 12/1969 | Speck | 534/831 |
| 3,923,778 A | * | 12/1975 | de Montmollin et al. | 534/827 |
| 3,932,376 A | * | 1/1976 | Feeman | 534/831 |
| 3,960,831 A | * | 6/1976 | Hippolyte Juy et al. | 534/829 |
| 4,092,103 A | * | 5/1978 | Stingl | 534/831 |
| 4,153,598 A | * | 5/1979 | Crounse | 534/827 |
| 4,652,269 A | * | 3/1987 | Bowles et al. | 534/831 |
| 4,694,303 A | | 9/1987 | Morino et al. | |
| 5,062,892 A | | 11/1991 | Halko | |
| 5,849,887 A | * | 12/1998 | Lehmann et al. | 534/642 |
| 6,126,700 A | * | 10/2000 | Bao-Kun et al. | 8/549 |
| 6,171,349 B1 | * | 1/2001 | Lai et al. | 8/549 |
| 7,098,319 B2 | * | 8/2006 | Chen et al. | 534/605 |
| 7,288,142 B2 | | 10/2007 | Lin et al. | |
| 7,387,667 B1 | | 6/2008 | Lin et al. | |
| 7,438,753 B2 | * | 10/2008 | Lin et al. | 106/31.52 |
| 7,524,368 B2 | * | 4/2009 | Lee et al. | 106/31.52 |

* cited by examiner

*Primary Examiner* — Helene Klemanski
(74) *Attorney, Agent, or Firm* — Turocy & Watson, LLP

(57) ABSTRACT

A novel black ink composition is provided. In the black ink composition of the present invention, the dye compounds include a blue dye compound of formula (I), a red dye compound of formula (II) and a yellow dye compound of formula (III). The black ink composition of the present invention is suitable for inkjet printing to improve light-fastness and printing property.

15 Claims, 3 Drawing Sheets

BLUE, RED, AND YELLOW DYE COMPOUNDS, AND BLACK INK COMPOSITION COMPRISING THE SAME

FIELD OF INVENTION

The present invention relates to a black ink composition, and more particularly, to a black dye composition including blue, red and yellow dye compounds for inkjet printing.

BACKGROUND OF THE INVENTION

Inkjet printing technology is non-impact printing, provides sharp and non-feathering images, and has great property such as water-fastness, light-fastness, optical density, storage stability and non-clogging, etc. Light-fastness property of dye compounds in an ink composition is essential to be applied in inkjet printing.

There are many dye compounds developed for inkjet printing; however, the current ink compositions still have many drawbacks. For example, U.S. Pat. Nos. 4,694,303, 5,062,892 and 7288142 disclose black ink dye compositions, including C.I. Food Black 2. However, these compositions have poor light-fastness. Taiwanese Patent No. I265193 and Taiwanese Patent Publication No. 200628564 disclose dye-mixed black ink compositions, which still have poor light-fastness. In order to improve light-fastness, U.S. Pat. No. 7,387,667 discloses a black dye composition; however, the light-fastness of this black dye composition needs to be further improved.

Accordingly, there exists an urgent need to develop a black ink composition having better property of dye compounds and meeting the foregoing requirements.

SUMMARY OF THE INVENTION

The present invention provides a novel black ink composition, including 0.1 to 15 wt % of dye compounds; 5 to 60 wt % of an organic solvent; and water.

The dye compounds in the black ink composition of the present invention include a blue dye compound having a structure of formula (I):

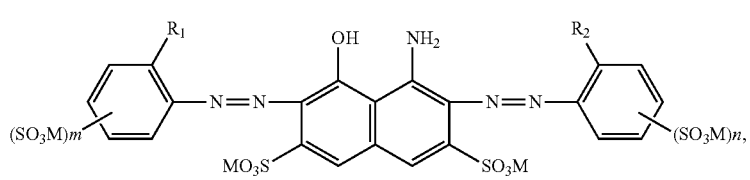

wherein $R_1$ and $R_2$ are independently Cl, COOM, $NO_2$ or $OCH_3$, M is H, Na, Li or $NH_4$; m is 0 or 1; and n is 0 or 1.

The dye compounds in the black ink composition of the present invention include a red dye compound having a structure of formula (II):

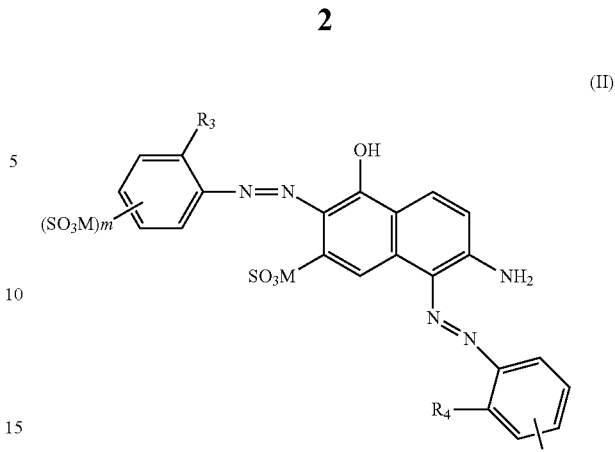

wherein $R_3$ and $R_4$ are independently Cl, COOM, $NO_2$ or $OCH_3$, M is H, Na, Li or $NH_4$; m is 0 or 1; and n is 0 or 1.

The dye compounds in the black ink composition of the present invention include a yellow dye compound having a structure of formula (III):

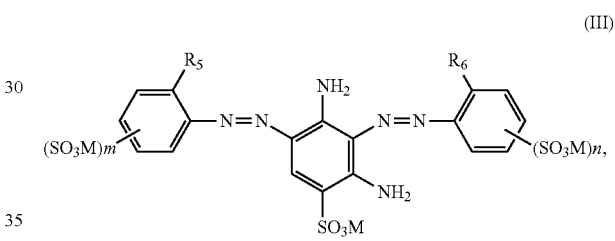

wherein $R_5$ and $R_6$ are independently Cl, COOM, $NO_2$ or $OCH_3$, M is H, Na, Li or $NH_4$; m is 0 or 1; and n is 0 or 1.

Specifically, the present invention provides a black ink composition, including a blue dye compound, a red dye compound and a yellow dye compound. These dye compounds are further prepared to form the black ink composition for being printed or dyed on an organic substrate. The organic substrate can be wool, silk, nylon, paper or leather. Particularly, paper or nylon applied with the black ink composition of the present invention has better coloring, light-fastness and dye quality.

DETAILED DESCRIPTION OF THE PREFERRED EMBODIMENTS

Figure 1:
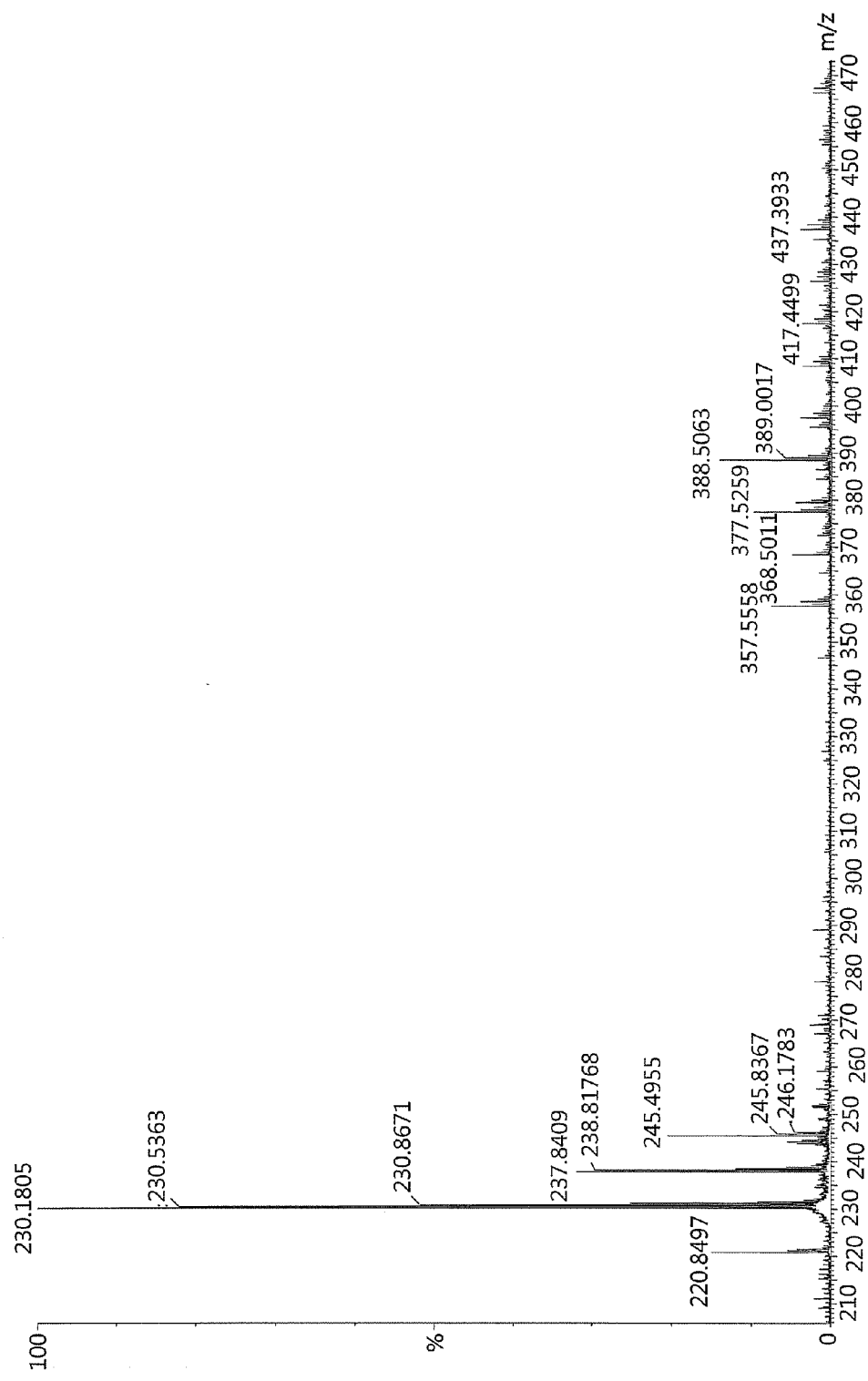
FIG. 1 provides a $^{13}C$ NMR spectrum of the compound of formula (I-1)

The following specific examples are used for illustrating the present invention. A person skilled in the art can easily conceive the other advantages and effects of the present invention.

In order to obtain a black ink composition, the present invention provides a novel blue dye compound having a structure of formula (I)

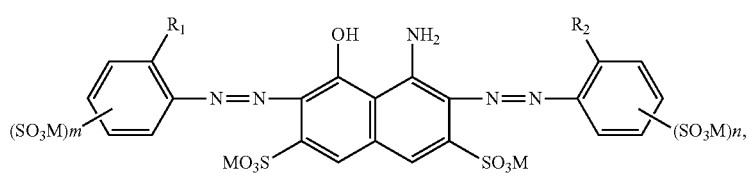

(I)

wherein $R_1$ and $R_2$ are independently Cl, COOM, $NO_2$ or $OCH_3$, M is H, Na, Li or $NH_4$; m is 0 or 1; and n is 0 or 1.

In one embodiment, the blue dye compound of the present invention can have a structure of following formula (I-1) or (I-2).

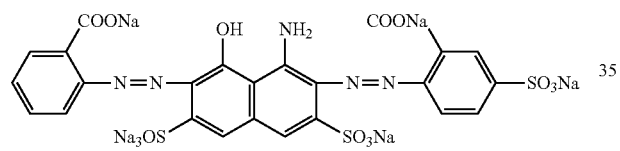

(I-1)

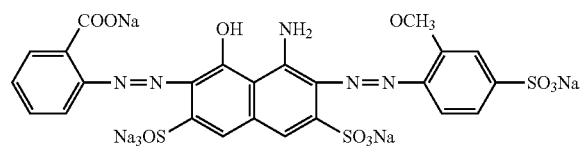

(I-2)

The compound of formula (I) is a blue dye compound, which may be used for a blue ink composition.

The following embodiment provides the preparation of the dye compound having a structure of formula (I). 5-sulfoanthranilic acid or its salt is dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0, and preferably at 5 to 8° C. and pH 0.8 to 1.2. A reaction of the diazonium salt solution and H acid or its salt (1-amino-8-naphthol-3,6-disulfonic acid or its salt) is performed to form an acidic combination. Subsequently, a diazotization reaction of anthranilic acid or its salt is further performed to form basic combination with the previous coupling compound. Then, the crude product is salted out with NaCl, and filtered to obtain a cake. The cake is dissolved in water, adjusted with 45% NaOH solution to have pH 8-9, desalted via reverse osmosis, and then dried to obtain a tetrazo dye compound of formula (I-1).

The present invention further provides a red dye compound having a structure of formula (II):

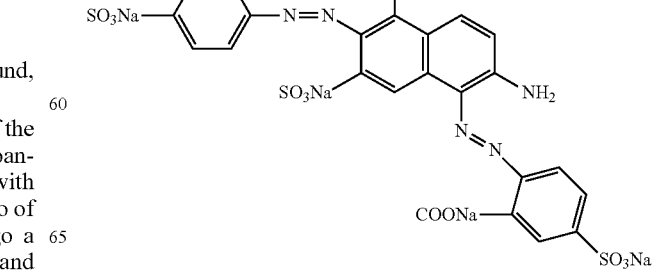

(II)

wherein $R_3$ and $R_4$ are independently Cl, COOM, $NO_2$ or $OCH_3$, M is H, Na, Li or $NH_4$; m is 0 or 1; and n is 0 or 1.

In one embodiment, the red dye compound of the present invention can have a structure of following formula (II-1) or (II-2).

(II-1)

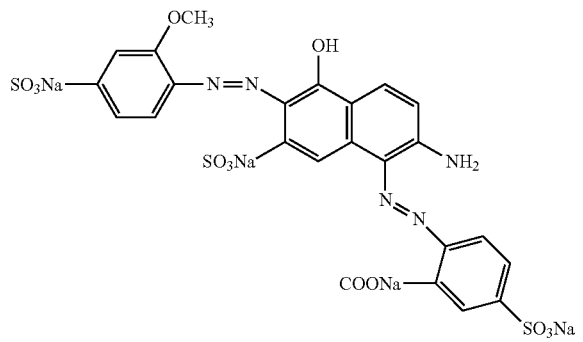

(II-2)

The compound of formula (II) is a red dye compound, which may be used for a red ink composition.

The following embodiment provides the preparation of the dye compound having a structure of formula (II). 5-sulfoanthranilic acid or its salt is dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0, and preferably at 5 to 8° C. and pH 0.8 to 1.2. Then, a reaction of the diazonium salt solution and J acid or its salt (2-amino-5-naphthol-7-sulfonic acid or its salt) is performed to form an acidic combination and further to form a basic combination. The crude product is salted out with NaCl, and filtered to obtain a cake. The cake is dissolved in water, adjusted with 45% NaOH solution to have pH 8-9, desalted via reverse osmosis, and then dried to obtain a tetrazo dye compound of formula (II-1).

The present invention further provides a yellow dye compound having a structure of formula (III):

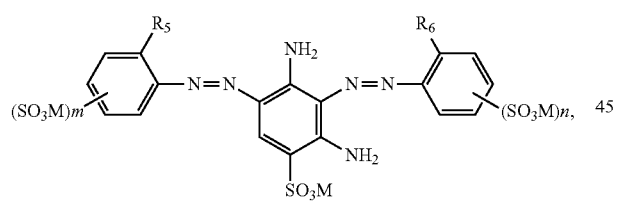

(III)

wherein $R_5$ and $R_6$ are independently Cl, COOM, $NO_2$ or $OCH_3$, M is H, Na, Li or $NH_4$; m is 0 or 1; and n is 0 or 1.

In one embodiment, the yellow dye compound of the present invention can have a structure of following formula (III-1) or (III-2).

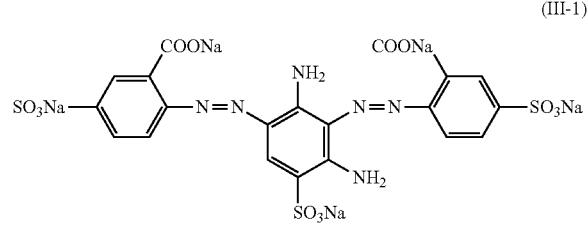

(III-1)

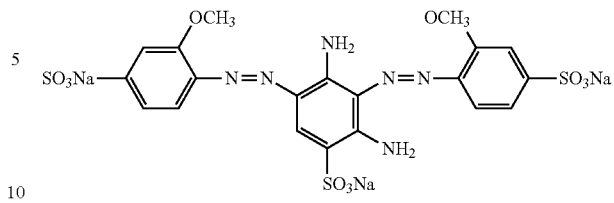

(III-2)

The compound of formula (III) is a yellow dye compound, which may be used for a yellow ink composition.

The following embodiment provides the preparation of the dye compound having a structure of formula (III). 5-sulfoanthranilic acid or its salt is dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0, and preferably at 5 to 8° C. and pH 0.8 to 1.2. Then, a reaction of the diazonium salt solution and 2,4-diaminobenzenesulfonic acid or its salt is performed to form an acidic combination and further to form a basic combination. The crude product is salted out with NaCl, and filtered to obtain a cake. The cake is dissolved in water, adjusted with 45% NaOH solution to have pH 8-9, desalted via reverse osmosis, and then dried to obtain a tetrazo dye compound of formula (III-1).

The present invention further provides a novel black ink composition including 0.1 to 15 wt % of dye compounds based on the total weight of the black ink composition; an organic solvent; and water. The dye compounds in the black ink composition include the compounds of formulae (I), (II) and (III):

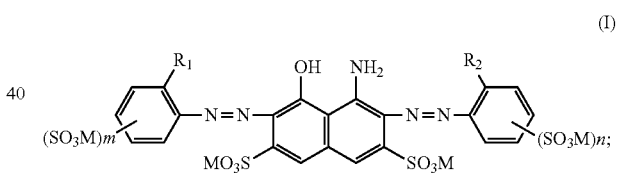

(I)

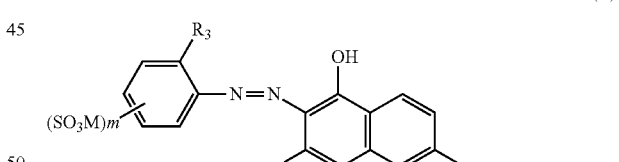

(II)

(SO$_3$M)n; and (III)

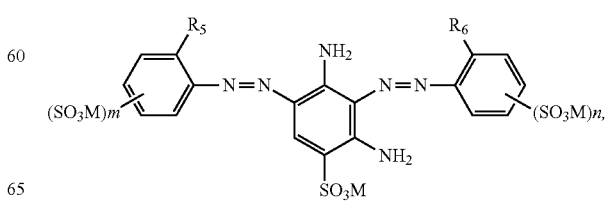

(III)

wherein $R_1$, $R_2$, $R_3$, $R_4$, $R_5$ and $R_6$ are independently Cl, COOM, $NO_2$ or $OCH_3$, M is H, Na, Li or $NH_4$; m is 0 or 1; and n is 0 or 1.

The organic solvent in the black ink composition is used for dissolving the dye compounds. For example, the organic solvent may be one or more selected from the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monoethyl ether, diethylene glycol monomethyl ether, triethylene glycol monoethyl ether, triethylene glycol monobutyl ether, glycerine, 2-pyrrolidone, N-methyl-2-pyrrolidone, 1,3-dimethyl-2-imidazolidinone and triethanolamine.

In the ink composition of the present invention, the amount of the organic solvent depends upon the nozzle property, printing stability and storage stability. Generally, the organic solvent is 5 to 60 wt %, and preferably 10 to 40 wt %, based on the total weight of the ink composition.

The water in the black ink composition of the present invention can be distilled water or deionized water, and preferably be deionized water.

In one embodiment of the blue dye compounds, $R_1$ and $R_2$ are both COOM, M is Na, and m and n are both 0 in the compound of formula (I). The blue dye compound thus has a structure of formula (I-1):

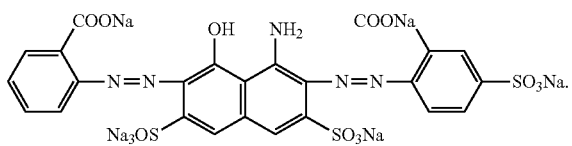

(I-1)

In another embodiment of the blue dye compounds, $R_1$ is COOM, $R_2$ is $OCH_3$, M is Na, and m and n are both 0 in the compound of formula (I). The blue dye compound thus has a structure of formula (I-2):

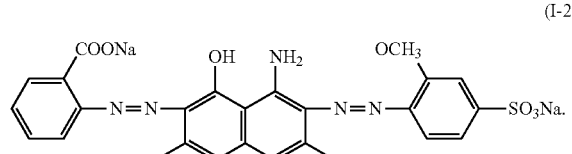

(I-2)

In one embodiment of the red dye compounds, $R_3$ and $R_4$ are both COOM, M is Na, and m and n are both 1 in the compound of formula (II). The red dye compound thus has a structure of formula (II-1):

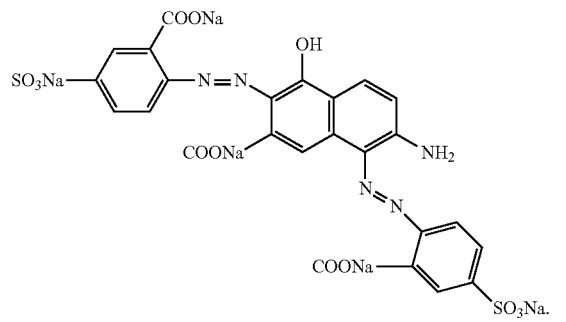

(II-1)

In another embodiment of the red dye compounds, $R_3$ and $R_4$ are both $OCH_3$, M is Na, and m and n are both 1 in the compound of formula (II). The red dye compound thus has a structure of formula (II-2):

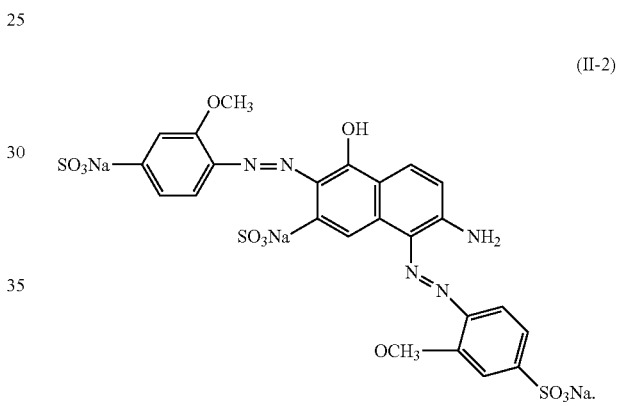

(II-2)

In one embodiment of the yellow dye compounds, $R_5$ and $R_6$ are both COOM, M is Na, and m and n are both 1 in the compound of formula (III). The yellow dye compound thus has a structure of formula (III-1):

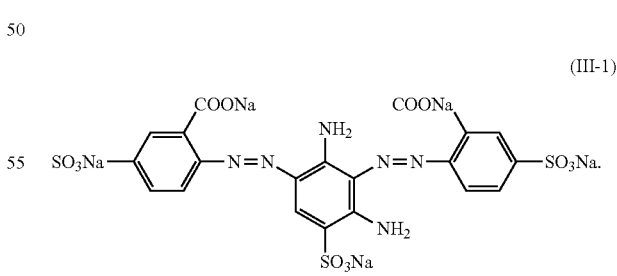

(III-1)

In another embodiment of the red dye compounds, $R_5$ and $R_6$ are both $OCH_3$, M is Na, and m and n are both 1 in the compound of formula (III). The red dye compound thus has a structure of formula (III-2):

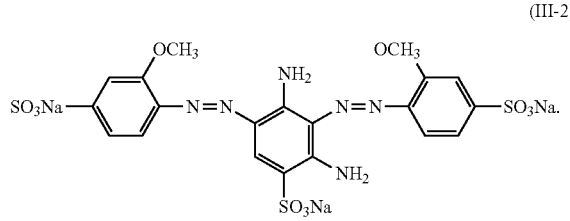
(III-2)

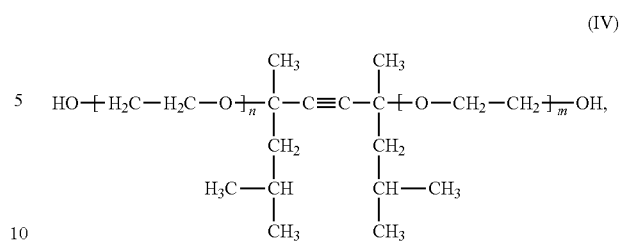
(IV)

wherein the sum of n and m is an integer ranging from 0 to 50.

In the preset invention, the black ink composition includes 0.1 to 15 wt %, preferably 2 to 12 wt %, and more preferably 3 to 10 wt % of the dye compounds based on the total weight of the black ink composition.

In the black ink composition of the present invention, the compound of formula (I) is 25 to 65 wt %, preferably 35 to 55 wt %; the compound of formula (II) is 15 to 45 wt %, preferably 20 to 40 wt %; and the compound of formula (III) is 10 to 40 wt %, preferably 15 to 35 wt %, based on the total weight of the dye compounds.

The black ink composition further includes a surfactant for increasing viscosity of ink and preventing the nozzle from being clogged. In the black ink composition of the present invention, the surfactant is 0.1 to 1 wt %, preferably 0.1 to 0.5 wt %, and more preferably 0.1 to 0.2 wt %, based on the total weight of the black inn composition. The surfactant may be, but not limited to, an acetylene glycol surfactant or an alkoxy compound surfactant. The acetylene glycol surfactant can be, for example, Surfynol 485, Surfynol 465, Surfynol 440, Surfynol 420 or Surfynol 104 (Air Products & Chemicals, Inc.) The alkoxy compound surfactant can be, for example, Tergitol 15-S-5, Tergitol 15-S-7 or Tergitol 15-S-9 (Union Carbide Corporation).

In addition, the black ink composition of the present invention further includes an antimicrobial agent for maintaining physical and chemical property of the ink composition. In the black ink composition of the present invention, the antimicrobial agent is 0.01 to 0.5 wt %. The antimicrobial agent can be, for example, NUOSEPT (Nudex Inc., a division of Huls Americal), PROXEL (ICI Americas Inc.), VANCIDE (RT Vanderbilt Co.) or UCARCIDE (Union Carbide Corporation).

In one embodiment, the dye compounds of formulae (I), (II) and (III) are mixed to form a black ink composition. The description about mixing of the dye compounds is well-known in the art so as to be omitted herein.

For example, the black ink composition of the present invention includes 0.1 to 15 wt % of the dye compounds; 20 to 30 wt % of the organic solvent; and 55 to 70 wt % of the deionized water. The detailed description about preparation of a black ink composition is well-known in the art, so as to be omitted herein.

The black ink composition of the present invention further includes a surfactant such as acetylene glycol derivatives. For example, the acetylene glycol derivative can be Surfynol 465, Surfynol 485, Surfynol 420 or Surfynol 104 (Air Products & Chemicals, Inc.), which has a structure of formula (IV):

Optionally, the black ink composition of the present invention further includes other additives such as a buffer for maintaining pH of the ink composition. The buffer can be, for example, acetic acid, acetate, phosphoric acid, phosphate, boric acid, borate or citrate. Moreover, the black ink composition may include a viscosity adjusting agent, such as polyvinyl alcohol or cellulose derivatives, or a defoaming agent.

The dye compounds of the present invention may be used independently or mixed with each other or its alkali metal salts. Preferably, the dye compounds include 0.5 wt % or less of salts based on the total weight of the dye compounds. The salts produced from the preparation and/or relatively high salts included in the dye compounds due to the added dilution agent can be desalted by ultra-filtering, nano-filtering, reverse osmosis or dialysis.

The dye compounds can be used for inkjet printing or dyeing an organic substrate. The organic substrate can be wool, silk, nylon, paper or leather, and preferably paper or nylon. The black ink composition of the present invention provides great printing property.

The preparation method of the black ink composition in the present invention is not limited. Alternatively, the dye compounds are mixed in water by the common methods.

The present invention is illustrated, but not limited, by the following embodiments. The compounds of the present invention are presented as free acid forms; however, the actual compounds may be metal salts, and preferably alkali metal salts such as sodium salts. Generally, the parts or percentage in the present invention is presented as weight percentage, and the temperature is presented as ° C.

Preparation of the Compound of Formula (I-1)

43.4 parts of 5-sulfoanthranilic acid or its salt were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. A reaction of the diazonium salt solution and 44.24 parts of H acid or its salt (1-amino-8-naphthol-3,6-disulfonic acid or its salt) were performed to form an acidic combination. Subsequently, diazotization reaction of 32.56 parts of anthranilic acid or its salt was further performed to form basic combination with the previous coupling compound. Then, the crude product was salted out with 800 parts of NaCl, and filtered to obtain a cake. The cake was dissolved in water, adjusted with 45% NaOH solution to have pH 8-9, desalted via reverse osmosis, and then dried to obtain a tetrazo dye compound of formula (I-1). FIG. 1 provides a $^{13}C$ NMR spectrum of the compound of formula (I-1).

Preparation of the Compound of Formula (II-1)

Figure 2:
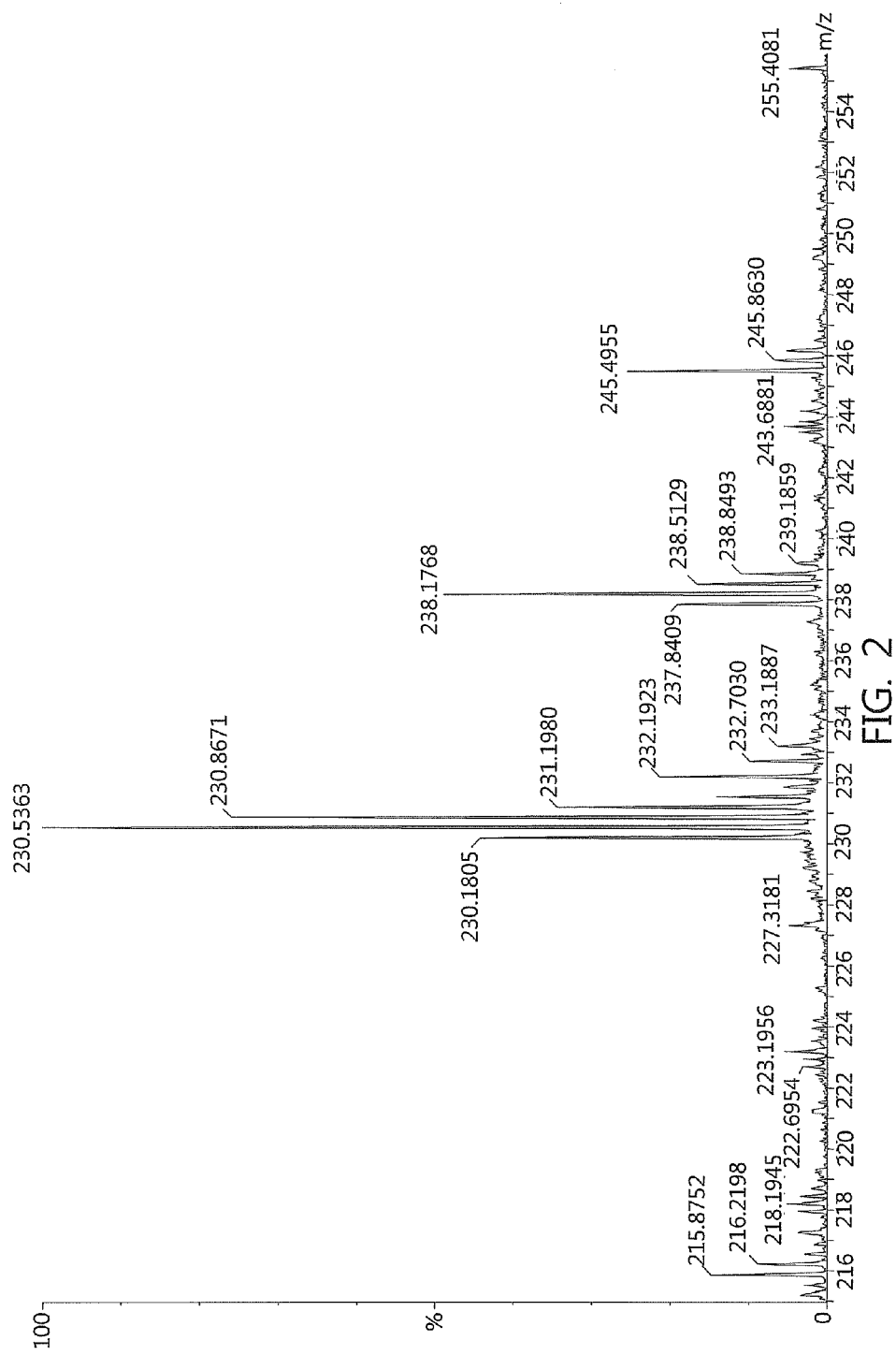
FIG. 2 provides a $^{13}C$ NMR spectrum of the compound of formula (II-1)

43.4 parts of 5-sulfoanthranilic acid or its salt were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. Then, a reaction of the diazonium salt solution and 23.44 parts of J acid or its salt (2-amino-5- naphthol-7-sulfonic acid or its salt) was performed to form an acidic combination and further to form a basic combination. The crude product was salted out with 800 parts of NaCl, and filtered to obtain a cake. The cake was dissolved in water, adjusted with 45% NaOH solution to have pH 8-9, desalted via reverse osmosis, and then dried to obtain a tetrazo dye compound of formula (II-1). FIG. 2 provides a $^{13}$C NMR spectrum of the compound of formula (II-1).

Preparation of the Compound of Formula (III-1)

Figure 3:
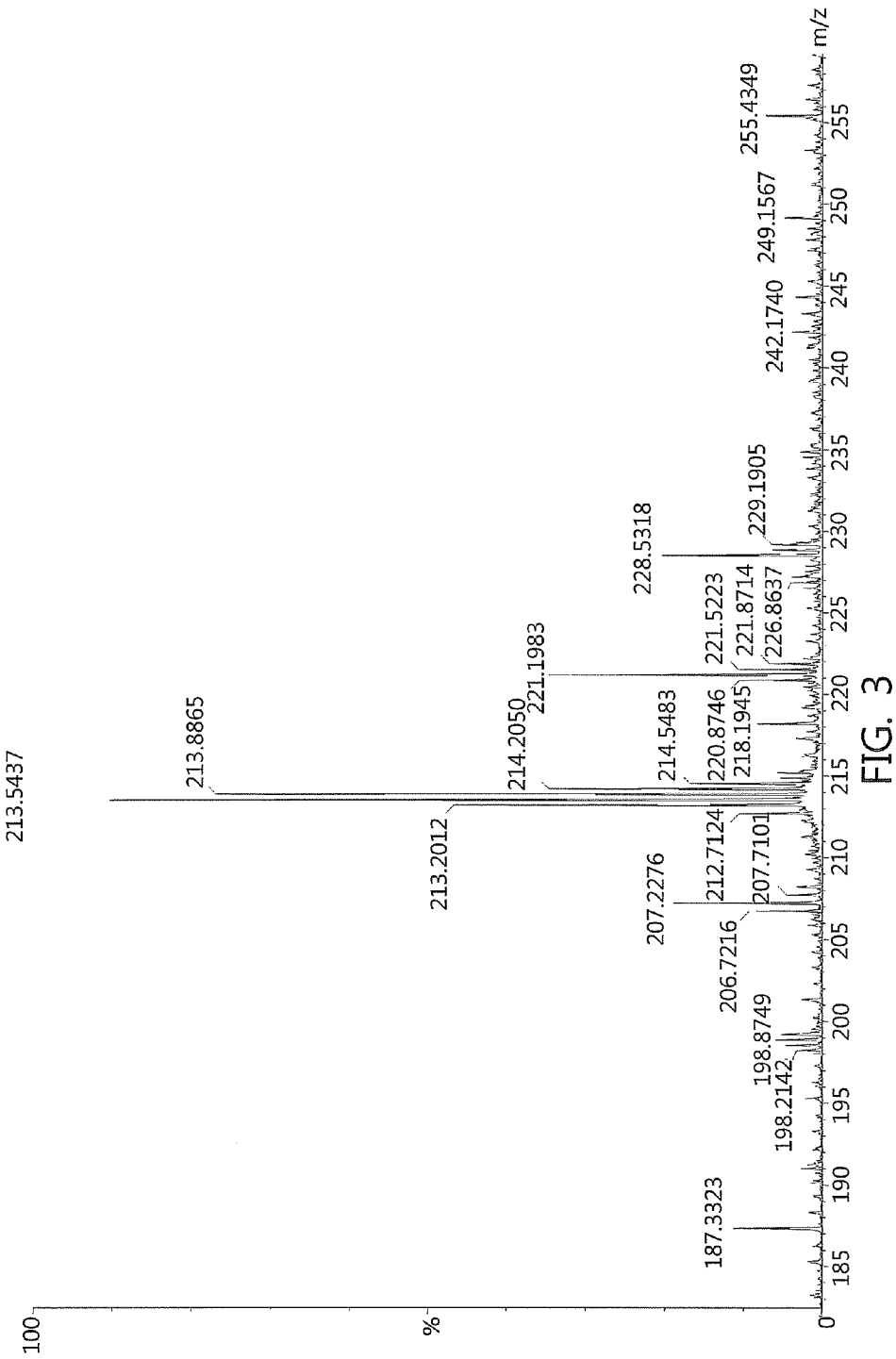
FIG. 3 provides a $^{13}C$ NMR spectrum of the compound of formula (III-1)

43.4 parts of 5-sulfoanthranilic acid or its salt were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0, and preferably at 5 to 8° C. and pH 0.8 to 1.2. Then, a reaction of the diazonium salt solution and 184 parts of 2,4-diaminobenzenesulfonic acid or its salt was performed to form an acidic combination and further to form a basic combination. The crude product was salted out with 800 parts of NaCl, and filtered to obtain a cake. The cake was dissolved in water, adjusted with 45% NaOH solution to have pH 8-9, desalted via reverse osmosis, and then dried to obtain a tetrazo dye compound of formula (III-1). FIG. 3 provides a $^{13}$C NMR spectrum of the compound of formula (III-1).

Preparation of the Compound of Formula (I-2)

10.85 parts of 3-amino-4-methoxybenzenesulfonic acid or its salt were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. A reaction of the diazonium salt solution and 15.8 parts of H acid or its salt (1-amino-8-naphthol-3,6-disulfonic acid or its salt) were performed to form an acidic combination. Subsequently, a diazotization reaction of 8.14 parts of anthranilic acid or its salt was further performed to form basic combination with the previous coupling compound. Then, the crude product was salted out with 200 parts of NaCl, and filtered to obtain a cake. The cake was dissolved in water, adjusted with 45% NaOH solution to have pH 8-9, desalted via reverse osmosis, and then dried to obtain a tetrazo dye compound of formula (I-2).

Preparation of the Compound of Formula (II-2)

10.85 parts of 3-amino-4-methoxybenzenesulfonic acid or its salt were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. Then, a reaction of the diazonium salt solution and 5.86 parts of J acid or its salt (2-amino-5-naphthol-7-sulfonic acid or its salt) was performed to form an acidic combination and further to form a basic combination. The crude product was salted out with 200 parts of NaCl, and filtered to obtain a cake. The cake was dissolved in water, adjusted with 45% NaOH solution to have pH 8-9, desalted via reverse osmosis, and then dried to obtain a tetrazo dye compound of formula (II-2).

Preparation of the Compound of Formula (III-2)

21.7 parts of 3-amino-4-methoxybenzenesulfonic acid or its salt were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. Then, a reaction of the diazonium salt solution and 9.2 parts of 2,4-diaminobenzenesulfonic acid or its salt was performed to form an acidic combination and further to form a basic combination. The crude product was salted out with 200 parts of NaCl, and filtered to obtain a cake. The cake was dissolved in water, adjusted with 45% NaOH solution to have pH 8-9, desalted via reverse osmosis, and then dried to obtain a tetrazo dye compound of formula (III-2).

Preparation of the Compound of Formula (I-3)

46.4 parts of sodium 2-nitroaniline-4-sulfonate were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. A reaction of the diazonium salt solution and 44.24 parts of H acid or its salt (1-amino-8-naphthol-3,6-disulfonic acid or its salt) were performed to form an acidic combination. Subsequently, a diazotization reaction of 32.56 parts of anthranilic acid or its salt was further performed to form basic combination with the previous coupling compound. Then, the crude product was salted out with 800 parts of NaCl, and filtered to obtain a cake. The cake was dissolved in water, adjusted with 45% NaOH solution to have pH 8-9, desalted via reverse osmosis, and then dried to obtain a tetrazo dye compound of formula (I-3).

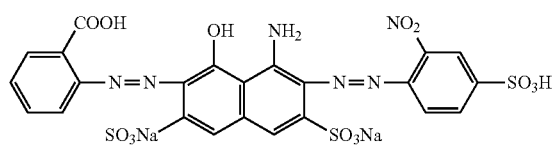

(I-3)

Preparation of the Compound of Formula (II-3)

23.33 parts of sodium 2-nitroaniline-4-sulfonate were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. A reaction of the diazonium salt solution and 23.44 parts of J acid or its salt were performed to form an acidic combination. Subsequently, a diazotization reaction of 21.73 parts of 3-amino-4-methoxybenzenesulfonic acid or its salt and sodium nitrite and hydrochloric acid solution (molar ratio of sodium nitrite to hydrochloric acid: 1:1.05) was further performed at 0 to 10° C., and then a basic combination was performed. Then, the crude product was salted out with 800 parts of NaCl, and filtered to obtain a cake. The cake was dissolved in water, adjusted with 45% NaOH solution to have pH 8-9, desalted via reverse osmosis, and then dried to obtain a tetrazo dye compound of formula (II-3).

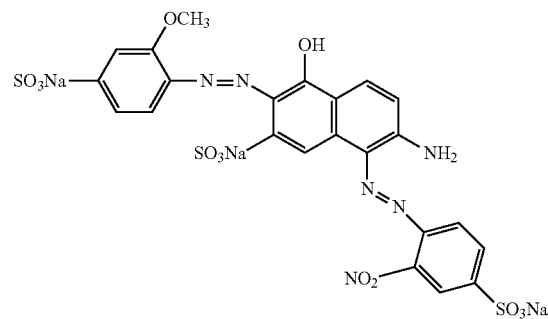

(II-3)

Preparation of the Compound of Formula (III-3) 46.6 parts of sodium 2-nitroaniline-4-sulfonate were dissolved in water and added with sodium nitrite and hydrochloric acid solution (molar ratio of sodium nitrite to hydrochloric acid: 1:1.05) to undergo a diazotization reaction at 0 to 10° C. and pH 0.5 to 2.0. Then, a reaction of the diazonium salt solution and 18.4 parts of 2,4-diaminobenzenesulfonic acid or its salt was performed to form an acidic combination and further to form a basic combination. The crude product was salted out with 800 parts of NaCl, and filtered to obtain a cake. The cake was dissolved in water, adjusted with 45% NaOH solution to have pH 8-9, desalted via reverse osmosis, and then dried to obtain a tetrazo dye compound of formula (III-3).

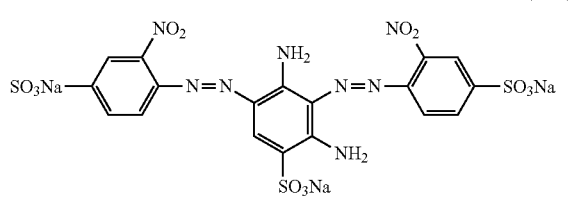

Embodiment 1

Preparation of the Black Dye Composition 3.53 parts of the compound of formula (I-1), 2.54 parts of the compound of formula (II-1) and 1.52 parts of the compound of formula (III-1) were mixed by a mixing machine to form 7.59 parts of the black ink composition of the present invention.

Embodiment 2

Preparation of the Black Dye Composition 5.33 parts of the compound of formula (I-2), 3.26 parts of the compound of formula (II-2) and 1.84 parts of the compound of formula (III-2) were mixed by a mixing machine to form 10.43 parts of the black ink composition of the present invention.

Embodiment 3

Preparation of the Black Dye Composition 4.83 parts of the compound of formula (I-3), 2.91 parts of the compound of formula (II-3) and 1.90 parts of the compound of formula (III-3) were mixed by a mixing machine to form 9.64 parts of the black ink composition of the present invention.

Embodiment 4

Preparation of the Black Ink Composition 7.52 parts of the black dye composition of Embodiment 1 were added with 64.18 parts of deionized water, mixed with NaOH solution, and then added with 10 parts of diethylene glycol, 10 parts of diethylene glycol mono-butyl ether, 7 parts of glycerine, 1 part of a surfactant and 0.3 part of an antimicrobial agent. After mixing, pH of the solution was adjusted by 32% HCl solution to be 7-7.5. Then, the mixture was filtered to form a black ink composition.

Embodiment 5

Preparation of the Black Ink Composition 10.43 parts of the black dye composition of Embodiment 2 were added with 61.27 parts of deionized water, mixed with NaOH solution, and then added with 10 parts of diethylene glycol, 10 parts of diethylene glycol mono-butyl ether, 7 parts of glycerine, 1 part of a surfactant and 0.3 part of an antimicrobial agent. After mixing, pH of the solution was adjusted by 32% HCl solution to be 7-7.5. Then, the mixture was filtered to form a black ink composition.

Embodiment 6

Preparation of the Black Ink Composition 9.64 parts of the black dye composition of Embodiment 3 were added with 62.06 parts of deionized water, mixed with NaOH solution, then added with 10 parts of diethylene glycol, 10 parts of diethylene glycol mono-butyl ether, 7 parts of glycerine, 1 part of a surfactant and 0.3 part of an antimicrobial agent. After mixing, pH of the solution was adjusted by 32% HCl solution to be 7-7.5. Then, the mixture was filtered to form a black ink composition.

Comparative Example 1

20 parts of Bayscrip Black SP (purchased from Bayer) were added with 51.7 parts of deionized water, mixed with NaOH solution, then added with 10 parts of diethylene glycol, 10 parts of diethylene glycol mono-butyl ether, 7 parts of glycerine, 1 part of a surfactant and 0.3 part of an antimicrobial agent. After mixing, pH of the solution was adjusted by 32% HCl solution to be 7-7.5. Then, the mixture was filtered to form a black ink composition.

Comparative Example 2

20 parts of EVERMAX BLACK SF-R LIQ (Everlight Chemical Industrial Corp.) were added with 51.7 parts of deionized water, mixed with NaOH solution, then added with 10 parts of diethylene glycol, 10 parts of diethylene glycol mono-butyl ether, 7 parts of glycerine, 1 part of a surfactant and 0.3 part of an antimicrobial agent. After mixing, pH of the solution was adjusted by 32% HCl solution to be 7-7.5. Then, the mixture was filtered to form a black ink composition.

Table 1 shows components of the ink compositions in Embodiments 4-6 and Comparative Examples 1-2.

TABLE 1

|  | Embodiment 4 | Embodiment 5 | Embodiment 6 | Comparative Example 1 | Comparative Example 2 |
| --- | --- | --- | --- | --- | --- |
| Dye compounds | 7.52% | 10.43% | 9.64% | 20% | 20% |
| DEG | 10% | 10% | 10% | 10% | 10% |
| DEGMBE | 10% | 10% | 10% | 10% | 10% |
| glycerine | 7% | 7% | 7% | 7% | 7% |
| S-465 | 1% | 1% | 1% | 1% | 1% |
| PROXEL-XL2 | 0.3% | 0.3% | 0.3% | 0.3% | 0.3% |

TABLE 1-continued

|  | Embodiment 4 | Embodiment 5 | Embodiment 6 | Comparative Example 1 | Comparative Example 2 |
|---|---|---|---|---|---|
| DI-water | 64.18% | 61.27% | 62.06% | 51.7% | 51.7% |
| Abs | 0.180/613 nm | 0.185/609 nm | 0.182/615 nm | 0.184/567 nm | 0.179/591 nm |

DEG: diethylene glycol;
DEGMBE: diethylene glycol mono-butyl ether;
S-465: surfactant purchased from Air Products & Chemicals, Inc.;
PROXEL-XL2: antimicrobial agent purchased from Bayer;
DI-water: deionized water The light-fastness of the black ink compositions of the present invention, Bayscrip Black SP (Bayer) and EVERMAX BLACK SF-R LIQ (Everlight Chemical Industrial Corp.) was tested. In the test, the printer is EPSONSTYLUS PHOTO 830U printer and the printed paper is plain paper. The printed paper was illuminated by a xenon arc lamp, wherein the total energy is 50 kJ, and then the color difference of the printed paper after the illumination was measured by DATACOLOR. The greater DE value means more color difference after illumination, i.e. worse light-fastness. The test results are shown in Table 2.

TABLE 2

|  | Light-fastness (50 kJ) | |
|---|---|---|
|  | DEL E | ISO-A05 |
| Embodiment 4 | 1.262 | 4 |
| Embodiment 5 | 1.380 | 4 |
| Embodiment 6 | 1.385 | 4 |
| Comparative Example 1 | 5.434 | 2-3 |
| Comparative Example 2 | 3.465 | 3 |

Accordingly, the black ink compositions prepared from the dye compounds of the preset invention have better light-fastness, so as to improve the printing property.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

What is claimed is:

1. A blue dye compound, having a structure of formula (I):

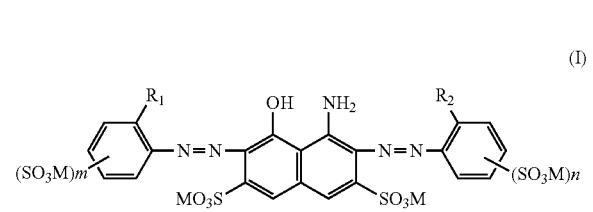

(I)

wherein $R_1$ and $R_2$ are independently Cl, COOM, $NO_2$ or $OCH_3$, M is H, Na, Li or $NH_4$; m is 0 or 1; and n is 0 or 1.

2. The blue dye compound of claim 1, having a structure of formula (I-1):

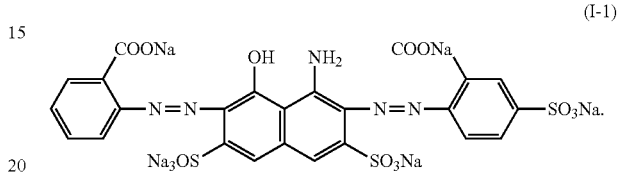

(I-1)

3. A red dye compound, having a structure of formula (II):

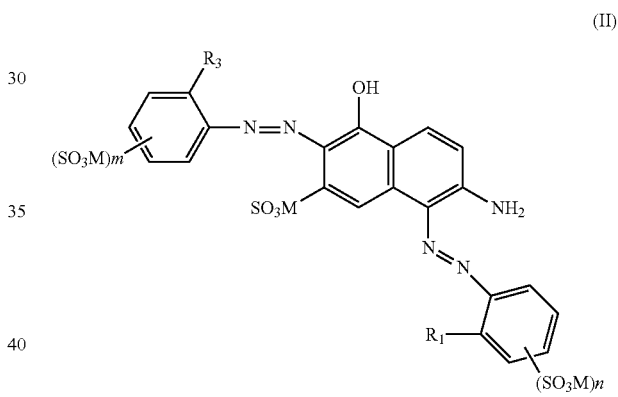

(II)

wherein $R_3$ and $R_4$ are independently Cl, COOM, $NO_2$ or $OCH_3$, M is H, Na, Li or $NH_4$; m is 0 or 1; and n is 0 or 1.

4. The red dye compound of claim 3, having a structure of formula (II-1):

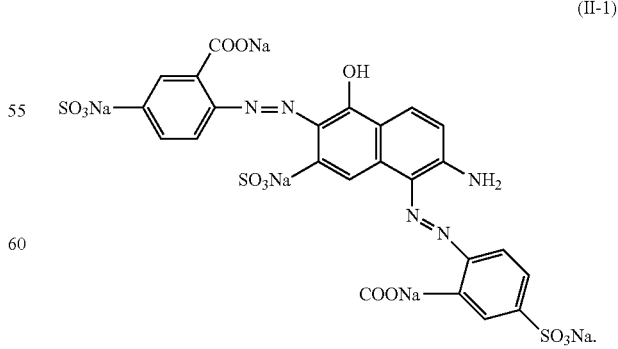

(II-1)

5. A yellow dye compound, having a structure of formula (III):

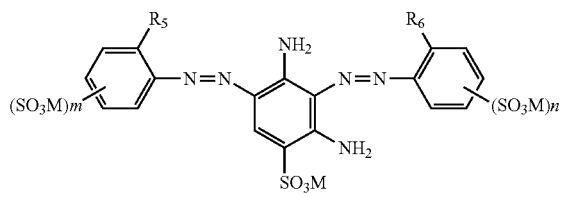

wherein $R_5$ and $R_6$ are independently Cl, COOM, $NO_2$ or $OCH_3$, M is H, Na, Li or $NH_4$; m is 0 or 1; and n is 0 or 1.

6. The yellow compound of claim 5, having a structure of formula (III-1):

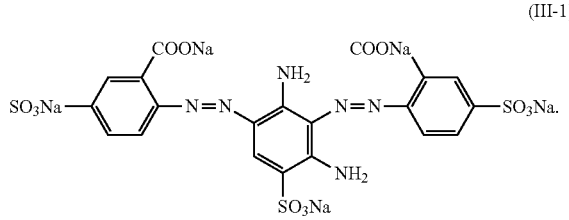

7. A black ink composition, comprising:
0.1 to 15 wt % of dye compounds including:
a blue dye compound, having a structure of formula (I):

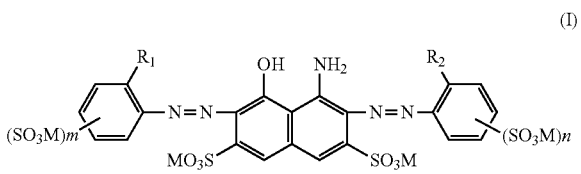

wherein $R_1$ and $R_2$ are independently Cl, COOM, $NO_9$ or $OCH_3$, M is H, Na, Li or $NH_4$; m is 0 or 1; and n is 0 or 1;
a red dye compound, having a structure of formula (II):

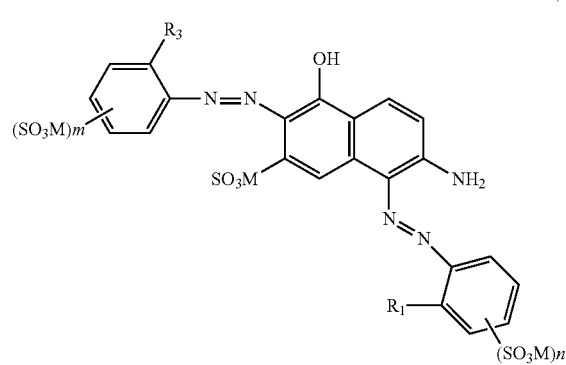

wherein $R_1$ and $R_4$ are independently Cl, COOM, $NO_9$ or $OCH_3$, M is H, Na, Li or $NH_4$; m is 0 or 1; and n is 0 or 1; and a yellow dye compound, having a structure of formula (III):

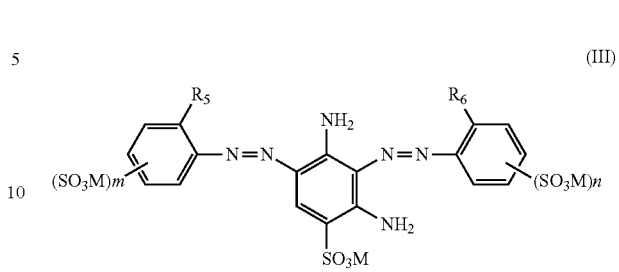

wherein $R_5$ and $R_6$ are independently Cl, COOM, $NO_2$ or $OCH_3$, M is H, Na, Li or $NH_4$; m is 0 or 1; and n is 0 or 1;
5 to 60 wt % of an organic solvent; and
water.

8. The black ink composition of claim 7, wherein the dye compounds include:
a blue dye compound, having a structure of formula (I-1):

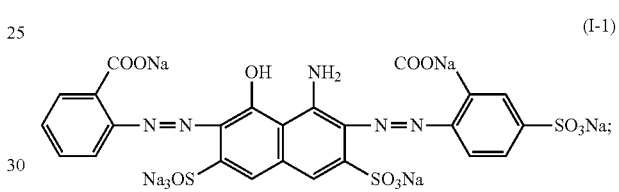

a red dye compound, having a structure of formula (II-1):

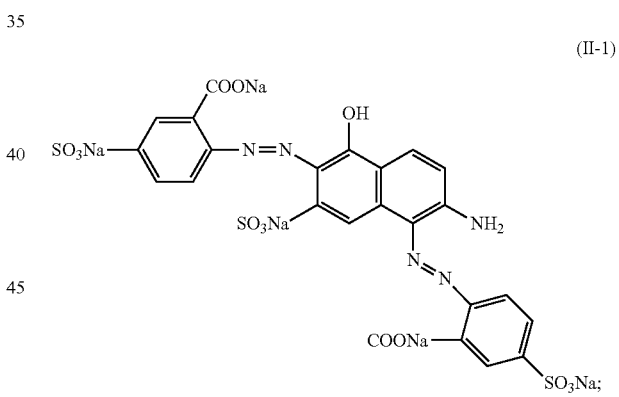

and
a yellow dye compound, having a structure of formula (III-1):

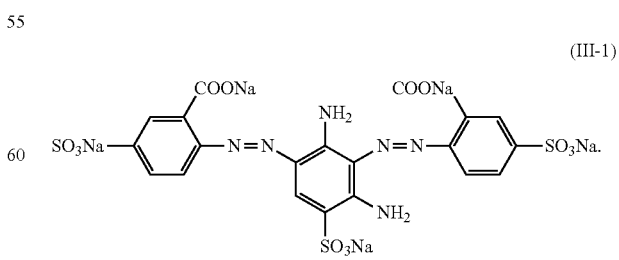

9. The black ink composition of claim 7, wherein the dye compounds comprise 25 to 65 wt % of the blue dye compound, 15 to 45 wt % of the red dye compound, and 10 to 40 wt % of the yellow dye compound based on a total weight of the dye compounds.

10. The black ink composition of claim 7, wherein the organic solvent is one selected from the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monoethyl ether, diethylene glycol monomethyl ether, triethylene glycol monoethyl ether, triethylene glycol monobutyl ether, glycerine, 2-pyrrolidone, N-methyl-2-pyrrolidone, 1,3-dimethyl-2-imidazolidinone and triethanolamine.

11. The black ink composition of claim 7, further comprising 0.1 to 1 wt % of a surfactant.

12. The black ink composition of claim 11, wherein the surfactant is an acetylene glycol surfactant or an alkoxy compound surfactant.

13. The black ink composition of claim 7, further comprising 0.01 to 0.5 wt % of an antimicrobial agent.

14. The black ink composition of claim 7, being printed or dyed on an organic substrate.

15. The black ink composition of claim 14, wherein the organic substrate is a paper or nylon.

\* \* \* \* \*